United States Patent [19]
Garrett

[11] Patent Number: 5,627,648
[45] Date of Patent: May 6, 1997

[54] METHOD AND APPARATUS FOR USE IN THE MEASUREMENT OF THE WAVELENGTH OR FREQUENCY OF AN OPTICAL SIGNAL

[75] Inventor: Carey M. Garrett, Kanata, Canada

[73] Assignee: JDS Fitel Inc., Nepean, Canada

[21] Appl. No.: 502,259

[22] Filed: Jul. 12, 1995

[51] Int. Cl.[6] ............................. G01J 3/51; G01B 9/02
[52] U.S. Cl. ...................... 356/416; 356/346; 356/419
[58] Field of Search ................................. 356/416, 419, 356/346

[56] References Cited

U.S. PATENT DOCUMENTS

| | | | |
|---|---|---|---|
| 3,853,404 | 12/1974 | Barrett | 356/346 |
| 4,172,663 | 10/1979 | Byer et al. | 356/346 X |
| 4,308,456 | 12/1981 | Van Der Gaag et al. | 356/416 X |
| 5,442,438 | 8/1995 | Batchelder et al. | 356/326 X |

FOREIGN PATENT DOCUMENTS

| | | | |
|---|---|---|---|
| 60-73342 | 4/1985 | Japan | 356/416 |
| 60-85339 | 5/1985 | Japan | 356/416 |

Primary Examiner—Vincent P. McGraw
Attorney, Agent, or Firm—Neil Teitelbaum & Associates

[57] ABSTRACT

The invention relates to a method of measuring the wavelength of an optical signal such as a light beam. The optical signal is directed toward a detector where its intensity is detected and stored. Several optical elements each having a different wavelength dependence are moved into the path of the optical beam one at a time and for each intensity is detected and stored. The wavelength of the optical signal is then approximately determined based upon the ratio of the detected intensity of the optical signal in the absence of any optical elements and the detected intensities of the optical signal in the presence of each optical element.

13 Claims, 4 Drawing Sheets

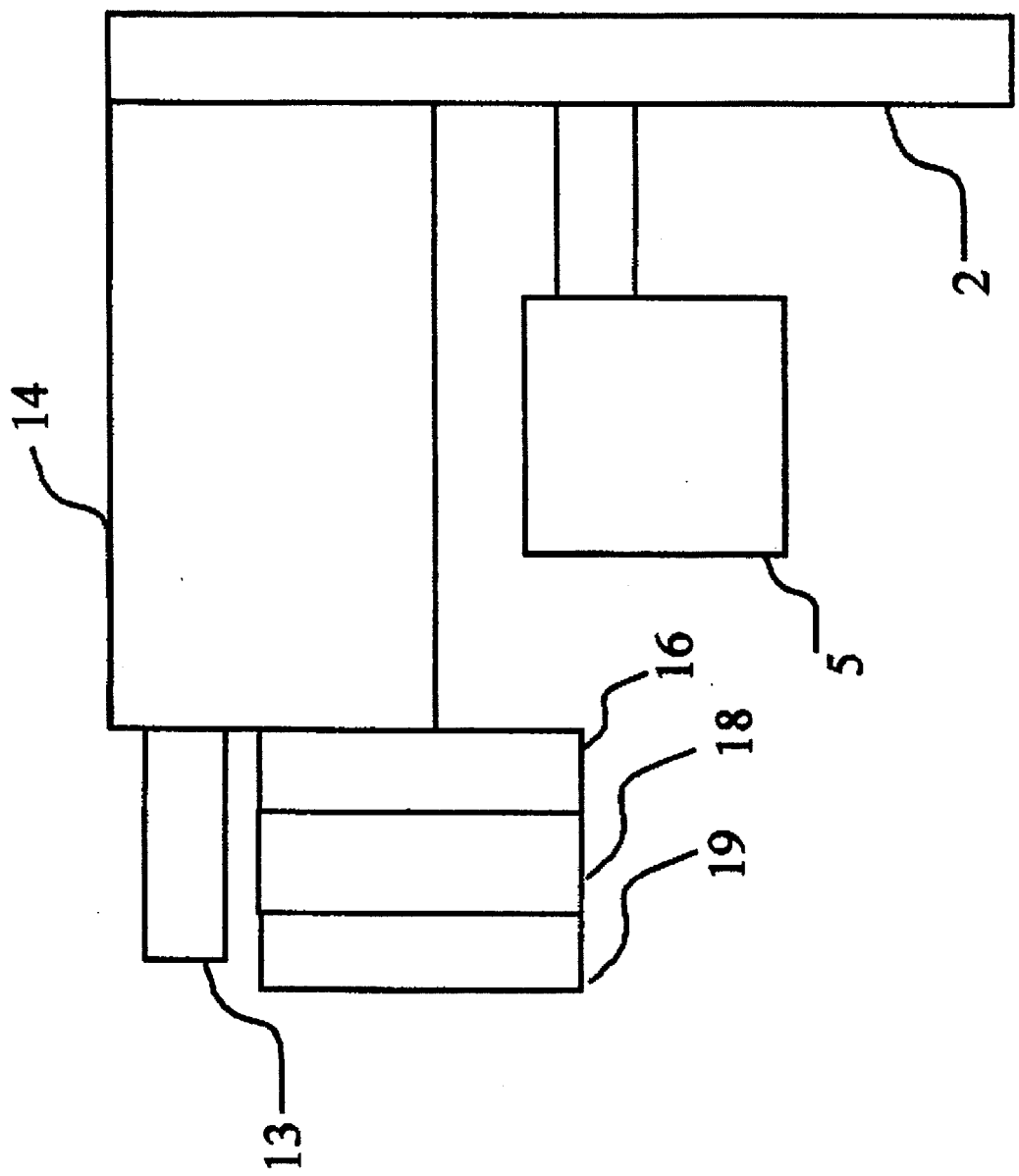

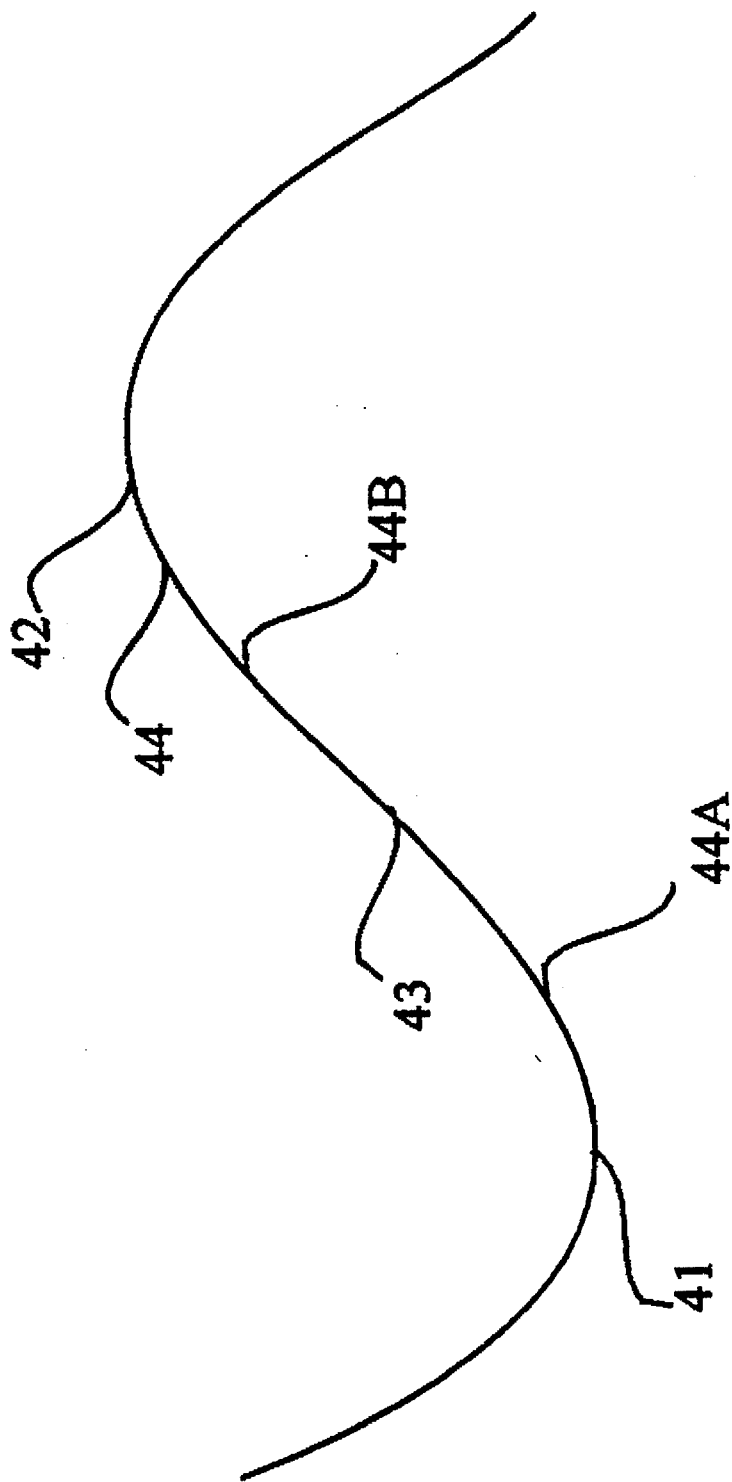

METHOD AND APPARATUS FOR USE IN THE MEASUREMENT OF THE WAVELENGTH OR FREQUENCY OF AN OPTICAL SIGNAL

FIELD OF THE INVENTION

This invention relates to a method and apparatus for measuring the wavelength of light, and more particularly to a method and apparatus for measuring the wavelength or frequency of optical radiation or an optical signal.

BACKGROUND OF THE INVENTION

In the area of optics, portable instruments capable of being used "out in the field" by technicians and service people are becoming in greater demand. As of late there have been requirements for relatively precise, reliable, portable and/or hand held devices that measure and display the frequency or wavelength of an optical signal. It is believed that devices of this sort, at an affordable cost, would be highly desirable. For example, there are instances when technicians trouble-shooting need to verify the frequency of an optical signal; perforating this "out in the field" can be an onerous task without the use of a portable measurement device. Other instances occur when a technician must connect particular optical fibers together—the connections requiring knowledge of the wavelength of signals carried on one or more of the optical fibers. Once more, a portable wavelength measurement device would offer a practicable solution.

SUMMARY OF THE INVENTION

In an embodiment the invention seeks to provide a method of measuring the wavelength of an optical beam comprising the steps of: directing an optical beam along a path toward a detector; optically aligning at least a wavelength dependent optical element, and the path of the optical beam such that the wavelength dependent optical element is in the path; for each of the at least a wavelength dependent optical element detecting an intensity of the optical beam that is present at the detector; and, approximately determining the wavelength of the optical beam within first predetermined limits in dependence upon the ratio of intensity of the at least one detected intensity of the optical beam present at the detector and the detected intensity of the optical beam present at the detector in the absence of a wavelength dependent optical element.

In an alternative embodiment the invention seeks to provide a method of measuring the wavelength of an optical beam, comprising the steps of: alternately plating a plurality of different wavelength-dependent optical elements in the path of an optical light beam and a detector, one at a time; detecting an intensity of light at the detector with each of the plurality of different wavelength-dependent optical elements; and determining a measurement for the wavelength of the optical light beam, said measurement being determined in dependence upon the ratio of the detected intensities of light at the detector and the intensity of the optical light beam at the detector absent any of the plurality of wavelength-dependent optical elements in the path.

In an alternative embodiment the invention seeks to provide an apparatus for measuring the wavelength of an optical beam comprising: an optical detector for detecting at least a portion of the optical beam; coupling means for optically coupling the optical beam to the optical detector and directing the optical beam along a predetermined path toward the optical detector; means for optically aligning a wavelength-dependent optical element having a characteristic that varies with wavelength of light incident upon it and the optical path defined between the detector and the coupling means such that the wavelength dependent optical element is in the optical path; and, means for determining within predetermined limits, the wavelength of the light beam, in dependence upon an intensity of light at the detector.

In an alternative embodiment the invention seeks to provide an apparatus for measuring the wavelength of an optical beam comprising: an optical detector for detecting at least a portion of the optical beam; coupling means for optically coupling the optical beam to the optical detector and directing the optical beam along a predetermined path toward the optical detector; a plurality of wavelength-dependent optical elements having a transmissive characteristic that varies with wavelength of light incident upon it; means for moving each wavelength-dependent optical element into and out of the optical path defined between the detector and the coupling means; and means for determining within predetermined limits, the wavelength of the light beam, in dependence upon at least an intensity of light at the detector.

BRIEF DESCRIPTION OF THE DRAWINGS

Exemplary embodiments of the invention will now be described in conjunction with the following figures in which:

FIG. 3 is a block diagram of an embodiment of a wavelength measuring apparatus according to this invention; and FIG. 4 is a graph of a periodic wavelength response similar to a response of a periodic wavelength-dependent optical element.

DETAILED DESCRIPTION OF THE INVENTION

A wavelength-dependent optical element such as an interference filter can have a substantially linear response across a given range of frequencies. Another form of wavelength-dependent optical element such as an etalon is periodic in its wavelength response. A period over which the wavelength response of such an optical element is repeated is referred to as its free spectral range (FSR). Thus, a periodic wavelength-dependent optical element has the same wavelength response for light with a wavelength $\lambda$ and for light with a wavelength $\lambda \pm FSR$. Because the FSR for periodic high precision wavelength-dependent optical elements is often smaller than the range of possible frequencies, their use in measuring wavelength has been limited.

It is now apparent that the use of both these types of high precision wavelength-dependent optical elements is advantageous in measuring the frequency of a light beam. The use of higher precision wavelength-dependent optical elements once the wavelength of the light beam is determined with a precision well within the range of wavelength response for the high precision wavelength-dependent optical element provides improved resolution to subsequent measurements. Alternately stated, once an accurate measurement of frequency of the light beam has been made, the precision can be improved using a further wavelength-dependent optical element with a narrower range which includes a previously measured frequency of the light beam.

The use of periodic high precision wavelength-dependent optical elements provides improved resolution to measurements once the wavelength of the light beam is determined with a precision well within the FSR of a high precision wavelength-dependent optical element. A single periodic high precision wavelength-dependent optical element may be responsive across a large range of wavelengths, thus reducing the overall number of required elements. Further, because of this periodic high precision wavelength-dependent optical elements may be used in any order providing responses in the form of intensities which can be stored and later retrieved for use in determining a wavelength measurement.

Figure 1:
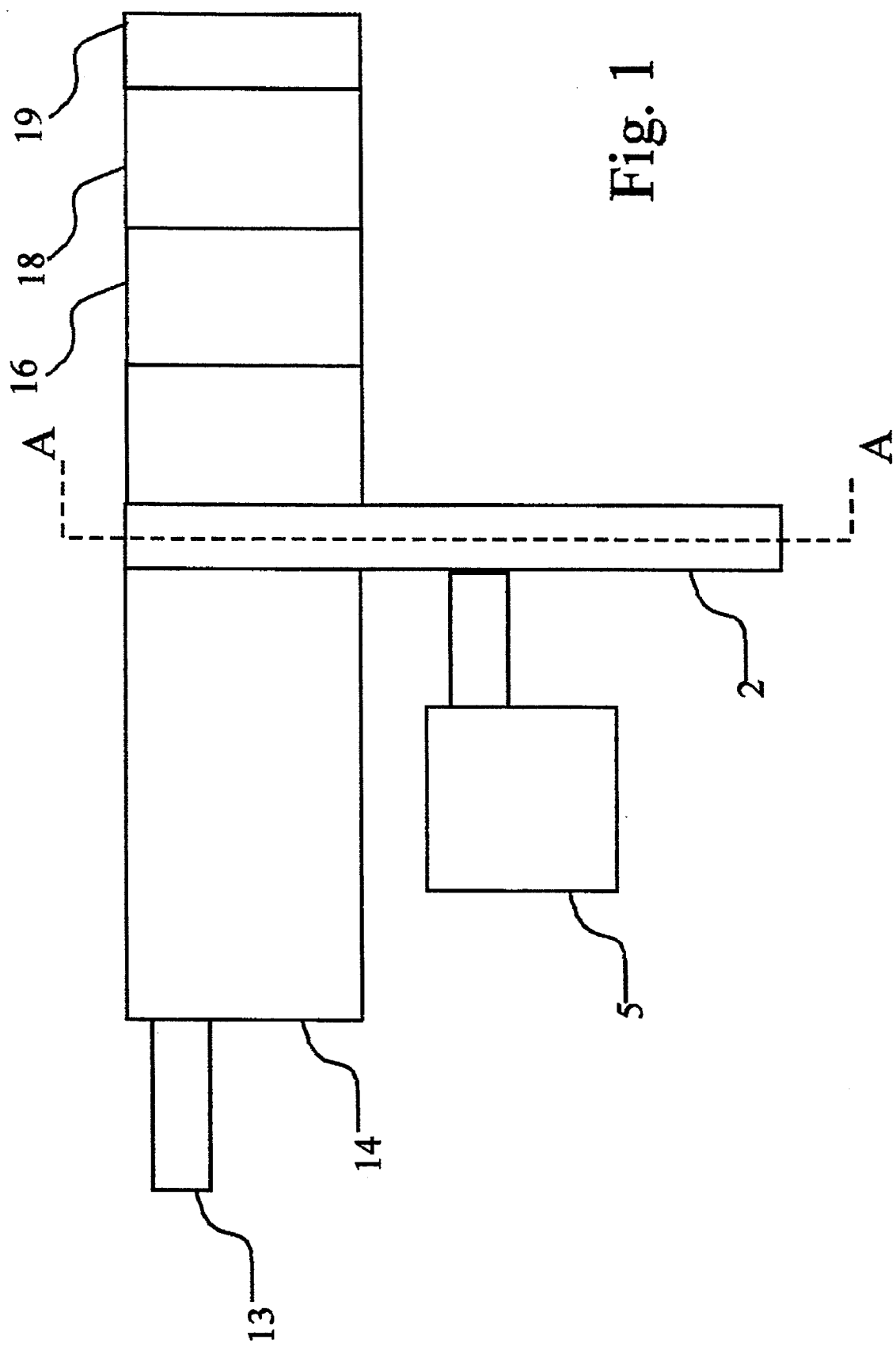
FIG. 1 is a block diagram of an embodiment of a wavelength measuring apparatus according to this invention.

Referring now to FIG. 1, a standard optical fiber 13 carrying an optical signal with a wavelength λ to be measured is coupled to a collimating lens 14. The collimating lens 14 is disposed to receive the signal in the form of a light beam, to collimate it, and direct it along a path towards a photodetector 16. A photodetector output signal having a current that is dependent upon an intensity of the input light signal is converted by an A/D converter 18 coupled to suitably programmed microprocessor 19 for determining and subsequently providing an output device, with a calculated wavelength measurement. Alternatively, the photodetector output signal may require amplification by an amplifier (not shown) prior to being converted by the A/D converter 18. The calculation is performed by comparing the ratio of the intensity of light at the detector with a wavelength-dependent element optically aligned within the optical path with the intensity of the light detected in the absence of the wavelength-dependent element. Methods of aligning the optical elements and the optical path are known. This may be accomplished by a motor 5 or by another means such as manually.

The photodetector 16 has a precision in measuring the intensity of the incoming light beam. The precision is a limiting factor in determining the wavelength of the signal to be measured. This invention provides a method and apparatus for increasing the resolution of intensity variations of the light beam reaching the photodetector 16. The invention uses a series of optical elements to provide varied resolution in the wavelength response in order to produce a single wavelength measurement with a desired precision. Therefore, with a commonly available photodetector 16, high precision measurements of wavelength can be made.

Figure 2:
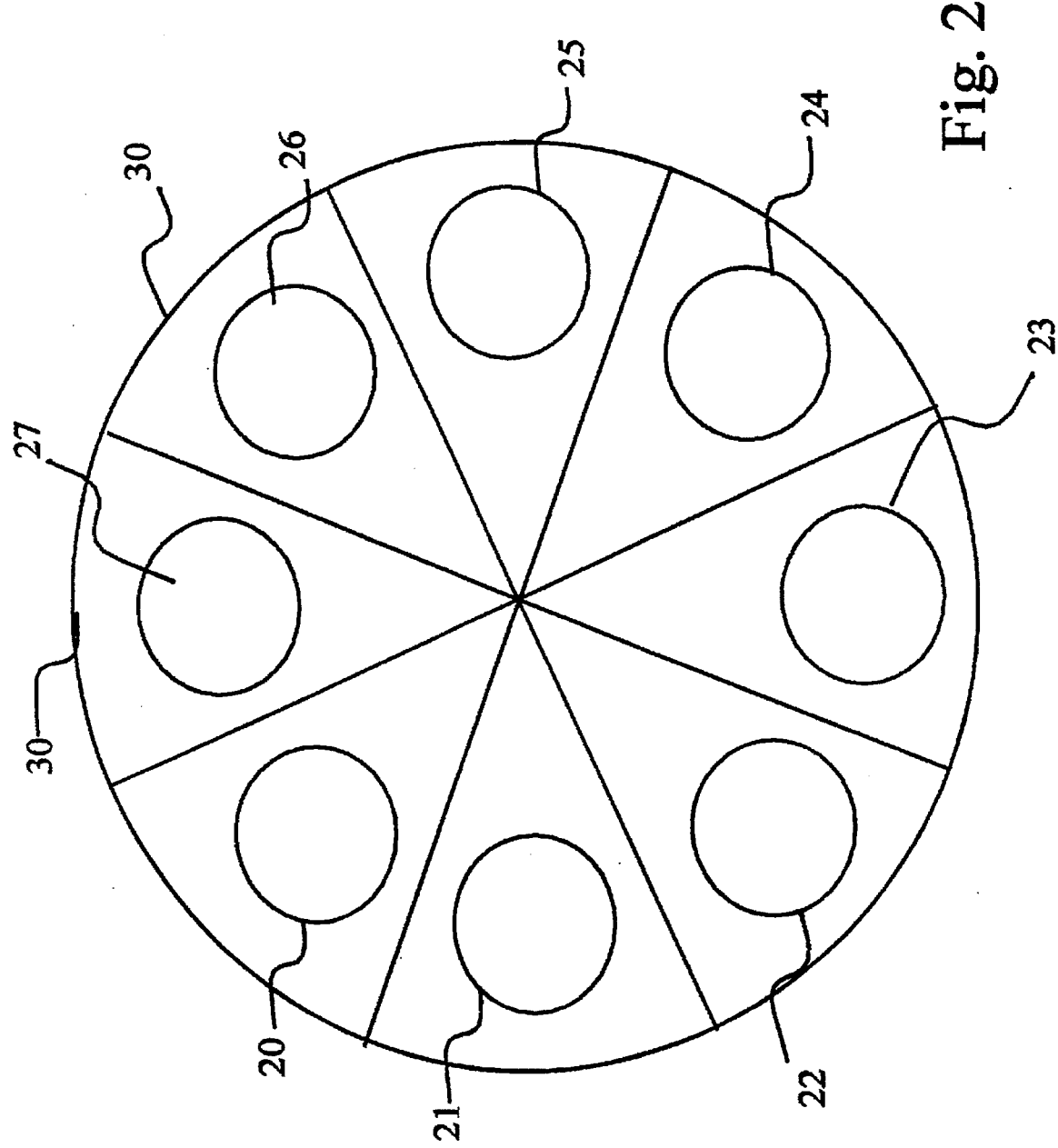
FIG. 2 is a cross sectional view taken along a line A—A in FIG. 1 of several optical elements arranged as a disc.

Referring now to FIG. 2, a disc is shown being formed of a plurality of similar sections 30. Each section has an aperture into which can be placed an optical element. The sections 30 are assembled into a disc in a conventional manner. Other shapes of supporting structures and apertures may also be used such as squares, triangles or irregular shapes. In use, no optical element or an optical element with a non wavelength-dependent response 27 in the form of glass is aligned with the path of the light beam. Light reaching the photodetector is measured and its intensity is stored.

A first wavelength-dependent optical element 20 such as a filter with a substantially ramp shaped wavelength response is located in the path of the light beam. Light reaching the photodetector after passing through the first wavelength-dependent optical element 20 has an intensity which is dependent on the wavelength response of the first optical element 20. By comparing the intensity of light at the photodetector 16 with the first optical element 20 in the path of the light beam, and light at the photodetector 16 in the absence of the an optical element or with a non wavelength-dependent optical element 27 in the path of the light beam, and using the known wavelength response of the first optical element 20 and the optical element 27 if used, a first calculated wavelength measurement is determined. When a desired precision of the measured optical wavelength is higher than that of the first calculated wavelength measurement, the first wavelength-dependent optical element 20 is removed from the path of the light beam.

The signal is now known to be within a measured wavelength range as measured using the first optical element 20. A second wavelength-dependent optical element 21 providing greater precision and in consequence thereof having a smaller FSR is placed in the path of the light beam. Light now reaching the photodetector 16 has an intensity which is dependent upon the wavelength response of the second optical element 21 which is periodic. It is preferable that the FSR of the optical element 21 be such that across the entire measured wavelength range, a unique wavelength response exists. By comparing the light intensity at the photodetector 16 with the second optical element 21 in the path of the light beam and the light at the photodetector in the absence of the an optical element or with a non wavelength-dependent optical element 27 in the path of the light beam, and using the known wavelength response of the second optical element 21 and the optical element 27, if used, and the measured wavelength range, a second calculated wavelength measurement is determined.

When the desired precision for the light beam is higher than that of the second calculated wavelength measurement, the method is repeated using more precise optical elements such as those shown at 22 through 26 until the desired precision is achieved. By selecting optical elements such that the precision increases from the full optical range to the desired precision across the full optical range, this invention provides a means of measuring the full optical range with the desired precision.

The order in which the optical elements are placed in the path of the light beam may not be significant. In fact, when using periodic wavelength-dependent optical elements, all the elements are placed in the path of the light beam and the intensity for each may is recorded. The calculation of the wavelength measurement is performed using the recorded intensities.

| Ratio | λ + 2 (nm) | λ + 0.02 (nm) |
| --- | --- | --- |
| 100% | 1580 | xxx2.0 |
| 75% | 1565 | xxx1.5 |
| 50% | 1550 | xxx1.0 |
| 25% | 1535 | xxx0.5 |
| 0% | 1520 | xxx0.0 |

A chart above showing ratios of intensity and their relation to calculated wavelength are shown for a series of two wavelength-dependent optical elements such as those shown at 20 and 21. The first column indicates the ratio of the light intensity at the photodetector 16 with an optical element in the path of the light beam and the light intensity at the photodetector 16 in the absence of an optical element. For example, when the known range for the signal is 1500 nm to 1600 nm and an optical element with the characteristics shown in the second column is used with a resulting ratio of 50%, the first calculated measurement is 1550 nm.

Thus use of a subsequent optical element with the characteristics shown in the third column results in an intensity representing a value ending with the digit 0, 1, or 2. This is based on the first calculated measurement of 1550+2 nm. When the resulting ratio is 25%, the second calculated measurement is 1550.50+0.01 nm.

The intensity of the light beam at the photodetector 16 can be stored for later use in determining the wavelength of the light beam. Clearly, the order in which optical elements are placed in the path of the light beam is unimportant when the intensity of the light beam at the photodetector 16 is stored for later use. Thus, the intensity of the light beam at the photodetector 16 can be stored with each of a series of wavelength-dependent optical elements, the stored intensities can then be used in the calculation of the wavelength measurement.

Alternatively, each wavelength-dependent optical element may have a ramp like response with a finite range. Using subsequent wavelength-dependent optical elements with smaller ranges provides increased precision. No optical element or an optical element with a non wavelength-dependent response 27 is located in the path of the light beam. Light reaching the photodetector 16 is measured and its intensity is stored. A first non periodic wavelength-dependent optical element 20 having a ramp like response is placed within the path of the light beam and, by comparing the light at the photodetector 16 with the first optical element 20 in the path of the light beam and the light at the photodetector 16 in the absence of the first optical element 20 and using the known wavelength response of the first optical element 20, a wavelength measurement is determined. Based on this wavelength measurement, a next, more precise, wavelength-dependent optical element can be chosen having the wavelength measurement within its range of acceptable wavelength response. This may require a greater number of optical elements in the apparatus as different elements may be necessary in order to cover any given range.

In an embodiment of the present invention, a wavelength-dependent optical element with a substantially linear wavelength response is used as the first optical element for determining the first calculated wavelength measurement. This measurement is in the form of a value and a precision (value±precision). Possible values for the calculated measurement lie between value-precision and value+precision. A subsequent optical element for use according to this invention is chosen such that for a light beam having any wavelength which falls within the possible values the wavelength response of the optical element is different from that for a light beam having any other wavelength which falls within the possible values; this is a unique wavelength response for a light beam with any wavelength from the possible values. Preferably the slope of the wavelength response for the range of possible values of wavelength does not approach zero.

For example when the first calculated wavelength measurement is 1550±1 nm, the possible values lie between 1549 nm through 1551 nm. A subsequent optical element must have a unique wavelength response for a light beam with any wavelength from the possible values. Using a periodic wavelength-dependent optical element, the free spectral range (peak to peak) must be at least 4 nm (in terms of wavelength) being 1551 nm–1549 nm (peak to valley). Further, to ensure a unique wavelength response an optical element with the minimum free spectral range would be required to have a peak at either a minimum or maximum of the possible values. In fact, the free spectral range of the subsequent wavelength-dependent optical element could be much larger than the minimum without affecting the results of the measurement. Carefully selecting subsequent wavelength-dependent optical elements, however, allows for a reduction in the overall number of wavelength-dependent optical elements required to achieve a desired precision.

It has been found that when using periodic wavelength-dependent optical elements, the precision is dependent on the slope of the wavelength response at the measured wavelength. Thus, if a periodic wavelength-dependent optical element has a sinusoidal wavelength response curve as shown in FIG. 4, at minimum wavelength response 41 and maximum wavelength response 42 the slope of the wavelength response curve is zero; small differences in frequency produces small differences in intensity of a transmitted or reflected light beam. Substantially at the midpoint between frequencies producing the minimum wavelength response 41 and the maximum wavelength response 42 the slope of the curve is large; small differences in a wavelength produces larger differences in the wavelength response 43 and consequently in the intensity of a transmitted or reflected light beam.

A free spectral range of at least twice the minimum allowable free spectral range overcomes this limitation and provides unique wavelength responses for a light beam with a wavelength from the possible values through the addition of a second periodic optical elements having identical free spectral ranges but offset by substantially π/2 in phase. A free spectral range of greater than twice the minimum allowable free spectral range improves the precision of a subsequent reading by limiting the slope of the wavelength response for the range of possible values of wavelength such that it does not approach zero. Referring to FIG. 4, a wavelength response 44 results from possible values and lies between 44A and 44B. At least some of these values are close to a maximum 42. Using an optical element having an identical free spectral range but offset by substantially π/2 in phase, the wavelength response is shifted. A more substantial slope results in greater differences in intensity of the light reaching the photodetector 16 for equivalent changes in frequency.

Referring now to FIG. 3, a further embodiment of the invention is presented. A standard optical fiber 13 carrying a signal with a wavelength λ to be measured is coupled to a collimating lens 14. The collimating lens 14 is disposed to receive the signal in the form of a light beam, to collimate it, and direct it along a path towards a reflective or partially reflective optical element 2. The reflected light beam is directed by the lens 14 towards a photodetector 16. Alternatively, the reflected light beam can be directed towards the photodetector 16 without passing through the lens 14. A photodetector output signal having a current that is dependent upon an intensity of the input light signal is converted by an A/D converter 18 coupled to suitably programmed microprocessor 19 for determining and subsequently providing an output device, with a calculated wavelength measurement. Alternatively, the photodetector output signal may require amplification by an amplifier (not shown) prior to being converted by the A/D converter 18. The calculation is performed by comparing the ratio of light at the detector with a wavelength-dependent element in the optical path with the detected light in the presence of a reflective or partially reflective optical element 2 such as a mirror.

Though the invention has been described with optical elements moving into and out of an optical path, such motion is relative. Thus, the optical path may be altered or a detector and a fiber may be moved such that the wavelength dependent optical element is situated in and out of the optical path as desired. This is referred to as optically aligning the optical element and the path.

Of course, numerous other embodiments may be envisaged without departing form the spirit and scope of the invention.

What I claim is:

1. A method of measuring the wavelength of an optical beam comprising the steps of:

directing the optical beam along a path toward a detector capable of detecting an intensity of incident light:

detecting a first intensity of the optical beam that is present at the detector absent an optical element having a substantial wavelength dependence:

providing a first optical element having a first wavelength dependence, in the path of the optical beam and detecting a second intensity of the optical beam that is present at the detector; and, approximately determining the wavelength of the optical beam within first predetermined limits in dependence upon the ratio of the second detected intensity of the optical beam present at the detector and the first detected intensity of the optical beam present at the same detector in the absence of an optical element having a substantial wavelength dependence.

2. A method as defined in claim 1, wherein the first optical element is an at least partially reflective optical element having a reflective characteristic that is dependent upon the wavelength of light incident upon it and, wherein the detector is positioned to receive the reflected signal.

3. A method as defined in claim 1, wherein the first optical element is an at least partially transmissive optical element having a transmissive characteristic that is dependent upon the wavelength of light incident upon it.

4. A method of measuring the wavelength of an optical light beam, comprising the steps of:

directing an optical beam along a path toward a detector capable of detecting an intensity of incident light with a predetermined precision;

detecting a first intensity of the optical beam that is present at the detector absent an optical element having a substantial wavelength dependence:

providing a range for the wavelength;

alternately optically aligning the path of the optical light beam and the detector and a plurality of periodic wavelength-dependent optical elements having a predetermined free spectral range, one at a time, such that each wavelength-dependent optical element is in the path;

detecting a further intensity of light at the detector with at least some of the plurality of wavelength-dependent optical elements; and determining a measurement for the wavelength of the optical light beam, said measurement being determined in dependence upon the ratio of the further detected intensities of light at the detector and the first detected intensity of the light in the absence of an optical element having a substantial wavelength dependence.

5. A method as defined in claim 4, wherein at least one of the plurality of optical elements is an at least partially transmissive optical element having a transmissive characteristic that is dependent upon the wavelength of light incident upon it.

6. A method as defined in claim 5, wherein providing the range for the wavelength is performed by the steps of:

optically aligning a wavelength dependent optical element in the path of the optical light beam and the detector;

detecting a second intensity of the optical beam that is present at the detector in the presence of the wavelength dependent optical element;

determining a wavelength in dependence upon the ratio of the second intensity of light at the detector and the first intensity of the light at the detector in the absence of an optical element having a substantial wavelength dependence; and providing a range in dependence on the ratio and the precision of the detector.

7. A method as defined in claim 6, wherein at least one of the plurality of periodic optical elements is an etalon having a predetermined natural resonating frequency corresponding to the predetermined free spectral range.

8. A method as defined in claim 4, wherein some of the plurality of wavelength-dependent optical elements placed in the path of the optical beam and the detector comprise a plurality of etalons each having a different natural resonating frequency.

9. Apparatus for measuring the wavelength of an optical beam comprising:

an optical detector for detecting at least a portion of the optical beam;

coupling means for directing the optical beam along a predetermined path toward the optical detector;

at least a means for holding an optical filter in a first position in the path and in a second position out of the path;

means for moving the at least a means for holding an optical filter from the first position to the second position; and, means for determining within predetermined limits, the wavelength of the light beam, in dependence upon at least an intensity of light at the detector when at least one of the at least a means for holding an optical filter is in the first position and the detected intensity of the optical beam present at the same detector when the at least a means for holding an optical filter is in the second position.

10. Apparatus as defined in claim 9, including that at least a wavelength-dependent optical element having a characteristic that varies with wavelength of light incident upon it.

11. Apparatus as defined in claim 10, wherein the wavelength-dependent optical element is an interference filter.

12. Apparatus as defined in claim 10, wherein the wavelength-dependent optical element is an etalon, the etalon being comprised of a solid block of light transmissive material and having partially reflective coated substantially parallel end faces.

13. Apparatus for measuring the wavelength of an optical beam comprising:

an optical detector for detecting an intensity of at least a portion of the optical beam;

coupling means for directing the optical beam along a predetermined path toward the optical detector;

a plurality of wavelength-dependent optical elements having a characteristic that varies with wavelength of light incident upon them;

means for optically aligning at least some of the plurality of wavelength-dependent optical elements and the optical path defined between the detector and the coupling means such that one of the at least some wavelength dependent optical elements is in the path;

means for detecting an intensity of light at the detector for each of the at least some wavelength dependent optical elements; and, means for determining within predetermined limits, the wavelength of the light beam, in dependence upon the detected intensities of light and the detected intensity of the light in the absence of an optical element having a substantial wavelength dependence.

* * * * *